United States Patent [19]
Nerlino et al.

[11] Patent Number: 6,082,880
[45] Date of Patent: Jul. 4, 2000

[54] ILLUMINATED ROOF ORNAMENT ATTACHMENT

[76] Inventors: Mike Nerlino, 11 Delwood Rd., Staten Island, N.Y. 10304; Joseph Magliocco, 61 Sideview Ave., Staten Island, N.Y. 10314

[21] Appl. No.: 09/182,736

[22] Filed: Oct. 29, 1998

[51] Int. Cl.[7] .............................. F21V 33/00; F21L 15/18

[52] U.S. Cl. .................... 362/493; 362/121; 362/252; 362/370; 362/398

[58] Field of Search ................................ 362/493, 121, 362/223, 252, 326, 398, 26, 31, 806, 807, 808, 812, 370

[56] References Cited

U.S. PATENT DOCUMENTS

| | | | |
|---|---|---|---|
| 4,625,265 | 11/1986 | Bushong | 362/549 |
| 5,255,170 | 10/1993 | Plamp et al. | 362/121 |
| 5,456,625 | 10/1995 | Dumond | 362/121 |
| 5,560,701 | 10/1996 | Payne | 362/496 |
| 5,564,816 | 10/1996 | Arcadia et al. | 361/121 |

*Primary Examiner*—Jon Henry

[57] ABSTRACT

An illuminated roof ornament attachment for attaching to the roof of a vehicle in a funeral procession. The attachment includes a base designed for attachment to an exterior surface of a vehicle and an ornament upwardly extended from the base. The ornament comprises a translucent material for permitting passage of light therethrough. A light source is provided in the ornament for illuminating the ornament.

3 Claims, 3 Drawing Sheets

ILLUMINATED ROOF ORNAMENT ATTACHMENT

BACKGROUND OF THE INVENTION

1. Field of the Invention

The present invention relates to attachments for attaching to funeral procession vehicles and more particularly pertains to a new illuminated roof ornament attachment for attaching to the roof of a vehicle in a funeral procession.

2. Description of the Prior Art

The use of attachments for attaching to funeral procession vehicles is known in the prior art. More specifically, attach me nts for attaching to funeral procession vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 5,590,621; U.S. Pat. No. 4,110,818; U.S. Pat. No. 4,493,652; U.S. Pat. No. 2,493,991; U.S. Pat. No. 2,324,614; and U.S. Pat. No. Des. 256,398.

While these devices fulfill their respective, particular objectives and requirements, the aforementioned patents do not disclose a new illuminated roof ornament attachment. The inventive device includes a base designed for attachment to an exterior surface of a vehicle and an ornament upwardly extended from the base. The ornament comprises a translucent material for permitting passage of light therethrough. A light source is provided in the ornament for illuminating the ornament.

In these respects, the illuminated roof ornament attachment according to the present invention substantially departs from the conventional concepts and designs of the prior art, and in so doing provides an apparatus primarily developed for the purpose of attaching to the roof of a vehicle in a funeral procession.

SUMMARY OF THE INVENTION

In view of the foregoing disadvantages inherent in the known types of attachments for attaching to funeral procession vehicles now present in the prior art, the present invention provides a new illuminated roof ornament attachment construction wherein the same can be utilized for attaching to the roof of a vehicle in a funeral procession.

The general purpose of the present invention, which will be described subsequently in greater detail, is to provide a new illuminated roof ornament attachment apparatus and method which has many of the advantages of the attachments for attaching to funeral procession vehicles mentioned heretofore and many novel features that result in a new illuminated roof ornament attachment which is not anticipated, rendered obvious, suggested, or even implied by any of the prior art attachments for attaching to funeral procession vehicles, either alone or in any combination thereof.

To attain this, the present invention generally comprises a base designed for attachment to an exterior surface of a vehicle and an ornament upwardly extended from the base. The ornament comprises a translucent material for permitting passage of light therethrough. A light source is provided in the ornament for illuminating the ornament.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated roof ornament attachment apparatus and method which has many of the advantages of the attachments for attaching to funeral procession vehicles mentioned heretofore and many novel features that result in a new illuminated roof ornament attachment which is not anticipated, rendered obvious, suggested, or even implied by any of the prior art attachments for attaching to funeral procession vehicles, either alone or in any combination thereof.

It is another object of the present invention to provide a new illuminated roof ornament attachment which may be easily and efficiently manufactured and marketed.

It is a further object of the present invention to provide a new illuminated roof ornament attachment which is of a durable and reliable construction.

An even further object of the present invention is to provide a new illuminated roof ornament attachment which is susceptible of a low cost of manufacture with regard to both materials and labor, and which accordingly is then susceptible of low prices of sale to the consuming public, thereby making such illuminated roof ornament attachment economically available to the buying public.

Still yet another object of the present invention is to provide a new illuminated roof ornament attachment which provides in the apparatuses and methods of the prior art some of the advantages thereof, while simultaneously overcoming some of the disadvantages normally associated therewith.

Still another object of the present invention is to provide a new illuminated roof ornament attachment for attaching to the roof of a vehicle in a funeral procession.

Yet another object of the present invention is to provide a new illuminated roof ornament attachment which includes a base designed for attachment to an exterior surface of a vehicle and an ornament upwardly extended from the base. The ornament comprises a translucent material for permitting passage of light therethrough. A light source is provided in the ornament for illuminating the ornament.

Still yet another object of the present invention is to provide a new illuminated roof ornament attachment that provides an illuminated indicator for indicating the a motorcade in a funeral procession for helping the visibility of the motorcade especially in traffic.

Even still another object of the present invention is to provide a new illuminated roof ornament attachment that may be configured in a variety of shapes and religious symbols as desired by the user to indicate motorcades of various religions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
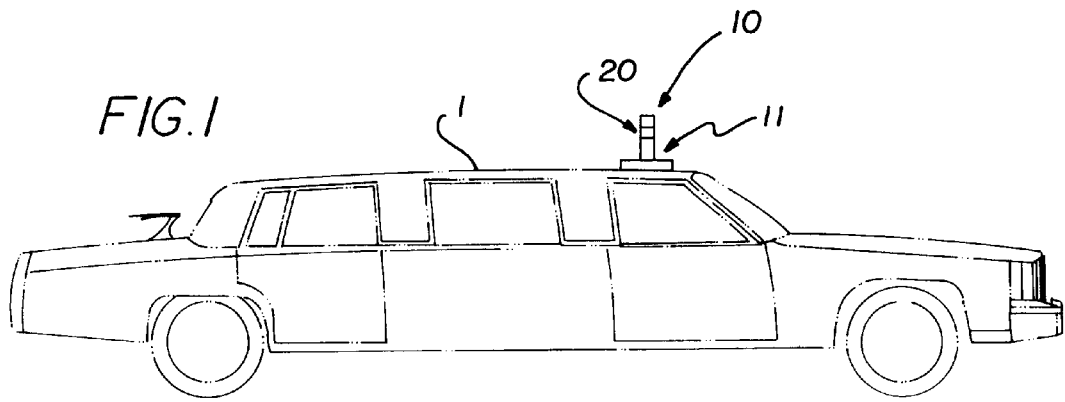
FIG. 1 is a schematic side view of a new illuminated roof ornament attachment in use attached to the roof of a vehicle according to the present invention.
Figure 2:
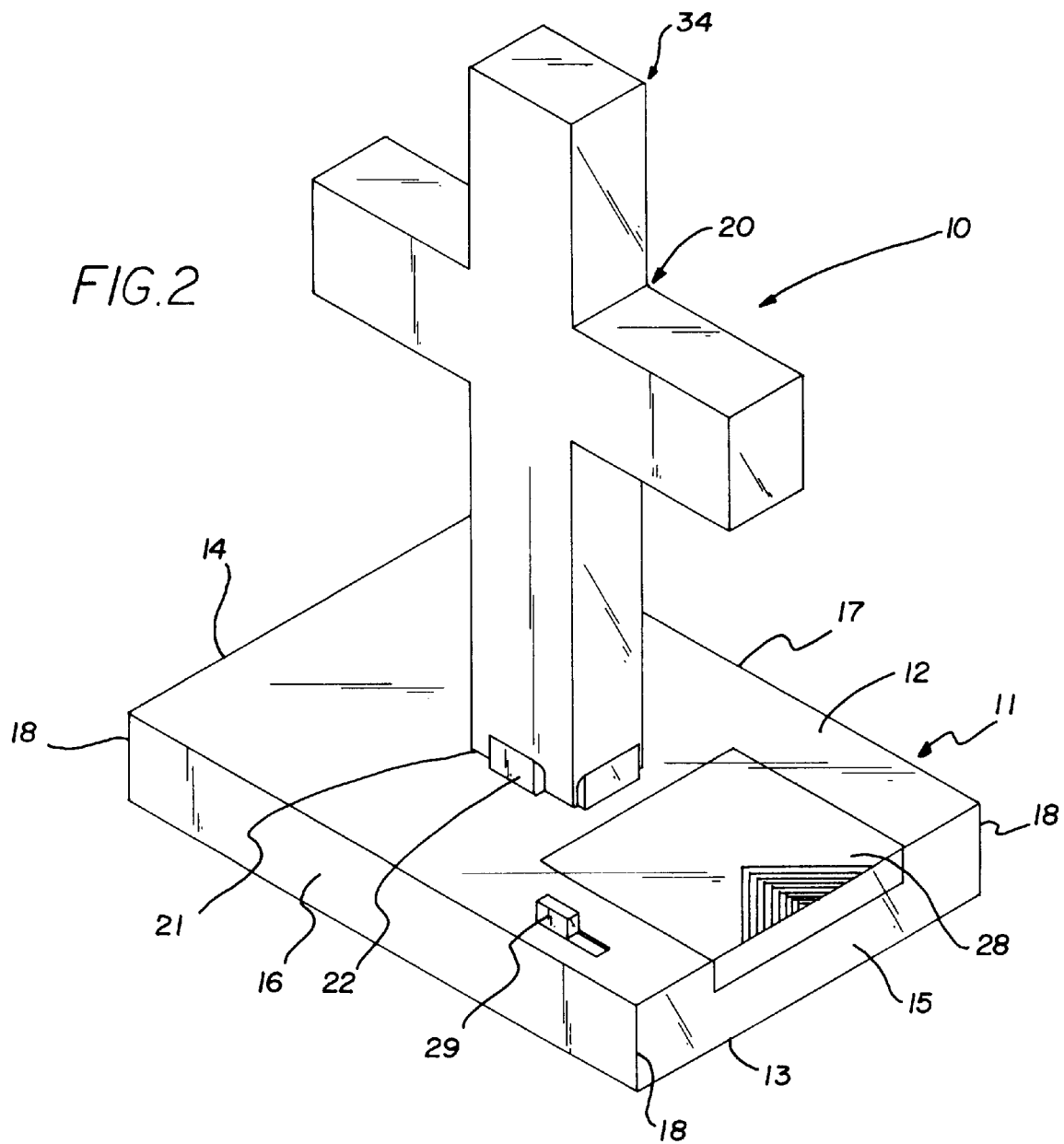
FIG. 2 is a schematic perspective view of the present invention.
Figure 3:
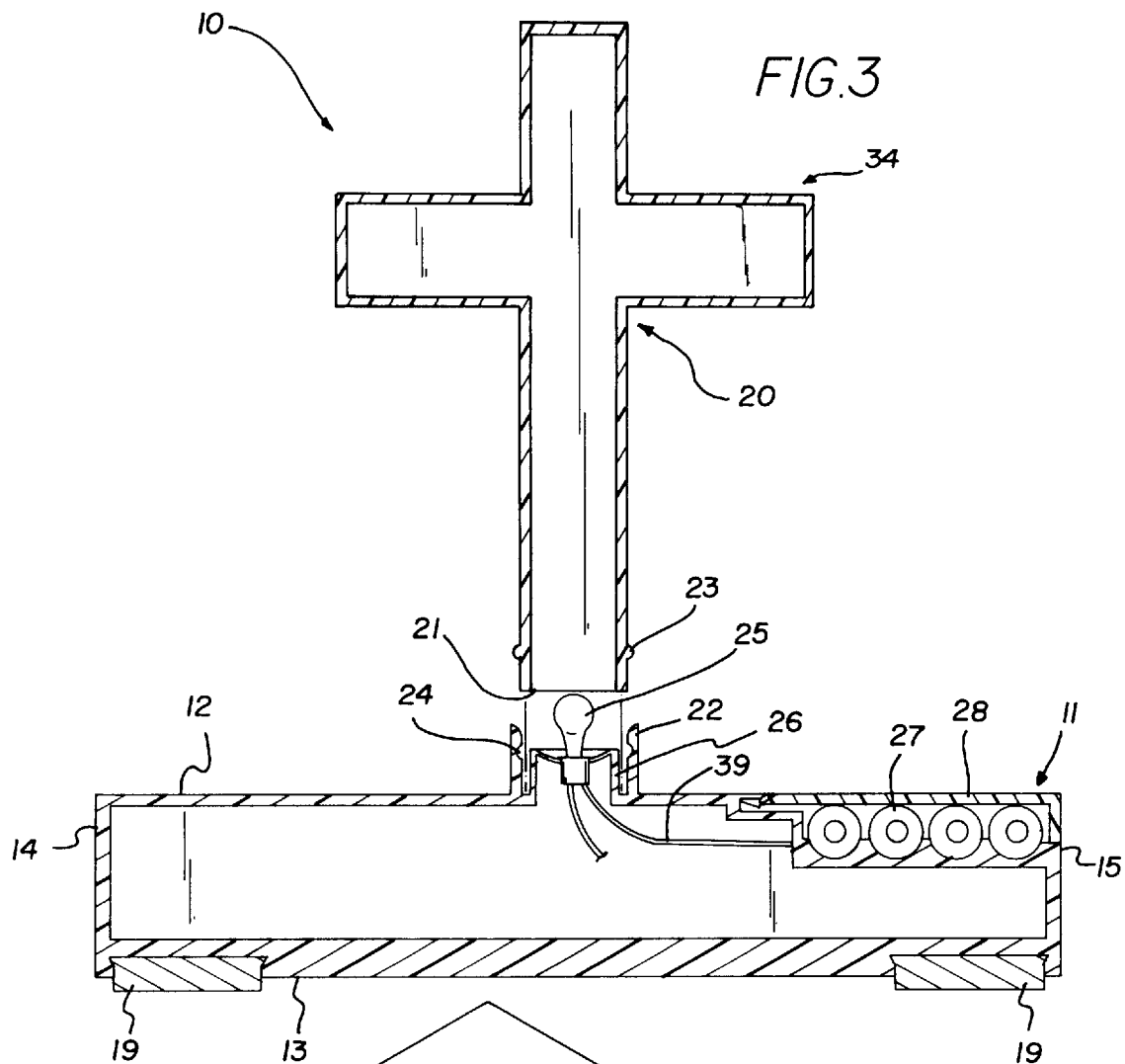
FIG. 3 is a schematic cross-sectional view of the present invention.
Figure 4:
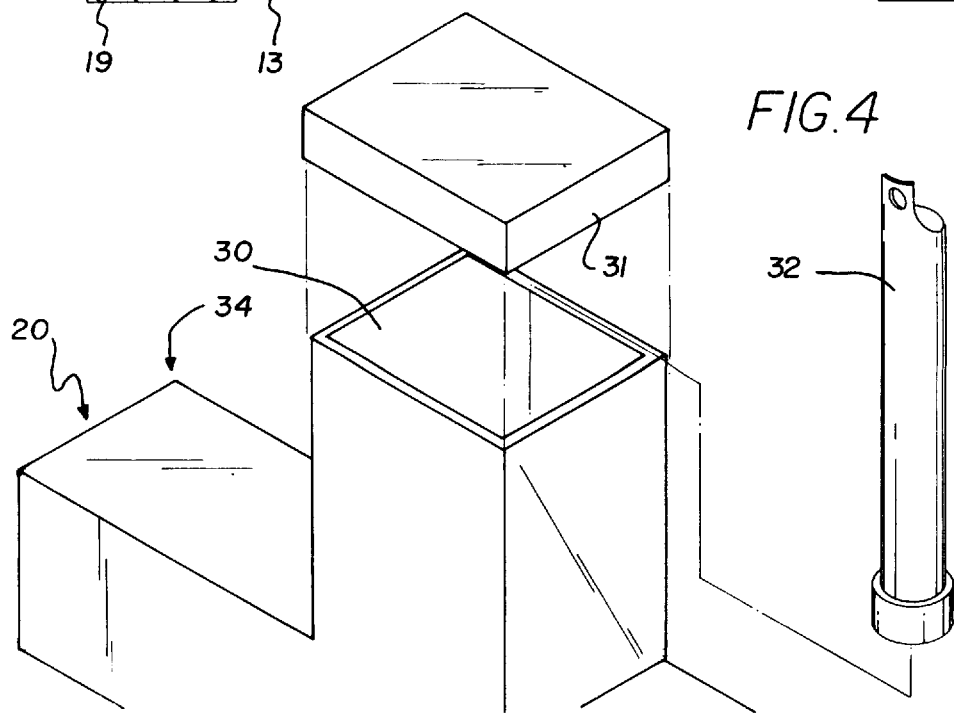
FIG. 4 is a schematic partial perspective view of the ornament of the present invention.
Figure 5:
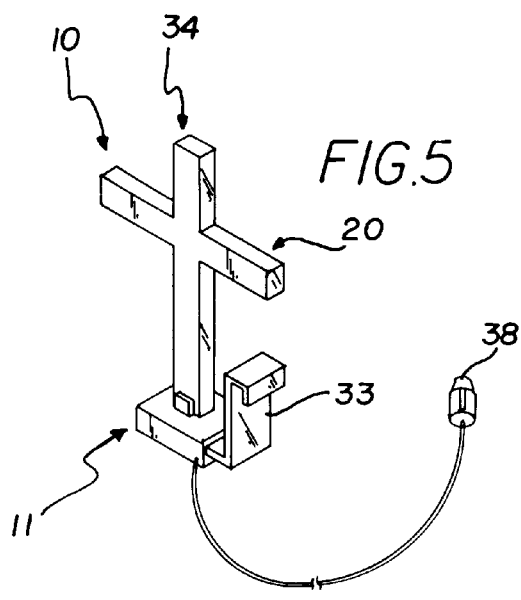
FIG. 5 is a schematic perspective view of an embodiment of the present invention having a mounting bracket for hanging on a window of a vehicle.

With reference now to the drawings, and in particular to FIGS. 1 through 8 thereof, a new illuminated roof ornament attachment embodying the principles and concepts of the present invention and generally designated by the reference numeral 10 will be described.

As best illustrated in FIGS. 1 through 8, the illuminated roof ornament attachment 10 generally comprises a base 11 designed for attachment to an exterior surface of a vehicle 1 and an ornament 20 upwardly extended from the base 11.

The ornament 20 comprises a translucent material for permitting passage of light therethrough. A light source 25 is provided in the ornament 20 for illuminating the ornament 20.

In closer detail, the base 11 is designed for attachment to an exterior surface of a vehicle 1, preferably the roof of the vehicle 1. The base 11 is preferably generally rectangular in configuration and has top and bottom surfaces 12,13, and an outer perimeter comprising a pair of end edges 14,15 a pair of side edges 16,17 extending between the end edges 14,15, and a plurality of corner edges 18. Preferably, the top and bottom surfaces 12.13 of the base 11 are generally planar and lying in generally parallel planes. Even more preferably, the end edges 14,15 and the side edges 16,17 of the base 11 are generally straight with the end edges 14.15 of the base 11 extending generally parallel to one another and the side edges 16,17 of the base 11 extending generally parallel to one another and generally perpendicular to the end edges 14,15 of the base 11. The base 11 has a thickness defined between the top and bottom surfaces 12,13 of the base 11, a length defined between the end edges 14,15 of the base I1, and a width defined between the side edges 16,17 of the base 11. Ideally, the length of the base 11 is at least about two times greater than the width of the base 11 and the thickness of the base 11 is less than about one-fourth the width of the base 11.

In use, the bottom surface 13 of the base 11 is designed for attachment to the exterior of the vehicle 1 such as the roof of the vehicle 1. Preferably, the bottom of the base 11 has a plurality of magnets 19 attached thereto for magnetically attaching the bottom surface 13 of the base 11 to a magnetic metallic surface of the exterior of the vehicle 1. Ideally, a magnet 19 is positioned on the bottom of the base 11 adjacent each of the corner edges 18 of the base 11.

The ornament 20 is upwardly extended from the top surface 12 of the base 11. Preferably, the ornament 20 is centrally positioned on the top surface 12 of the base 11. The ornament 20 has a lower end 21 coupled to the top surface 12 of the base 11. In the preferred embodiment, the lower end 21 of the ornament 20 has a generally rectangular periphery. The top surface 12 of the base 11 has a plurality of retaining tabs 22 detachably coupling the lower end 21 of the ornament 20 to the top surface 12 of the base 11. The retaining tabs 22 are preferably arranged along a generally rectangular outline around the lower end 21 of the ornament 20. The ornament 20 ideally has a plurality of outwardly extending retaining nubs 23 adjacent lower end 21 of the ornament 20 while each of the retaining tabs 22 ideally has a retaining recess 24. Each of the retaining nubs 23 is associated with a retaining recess 24 so that each of the retaining nubs 23 is inserted into the associated retaining recess 24 to help hold the lower end 21 of the ornament 20 to the top surface 12 of the base 11.

The ornament 20 comprises a translucent or transparent material such as a translucent plastic for permitting passage of light therethrough. A light source 25 is provided in the ornament 20 for illuminating the ornament 20 from the inside. In a preferred embodiment, the light source 25 is mounted to the top surface 12 of the base 11 on a extent 26. The lower end 21 of the ornament 20 has a hole extending into the ornament 20 through which the light source 25 is extended into the ornament 20 such that the extent 26 is inserted into the lower end 21 of the ornament 20 to help hold the ornament 20 vertically upright on the top surface 12 of the base 11. In this preferred embodiment, the light source 25 ideally, comprises an electrically powered light source 25 such as a light bulb or an LED. A power source 27 for powering the light source 25 is electrically connected to the light source 25 by wires 39. Ideally, the power source 27 comprises a battery power source 27 provided in the base 11. Ideally, the base 11 has an access panel 28 providing a closable opening 30 into the base 11 for permitting user access to the power source 27. The access panel 28 is preferably located on the top surface 12 of the base 11 adjacent one end edge 15 of the base 11. A switch 29 is mounted to the base 11 and is electrically connected to the light source 25. The switch 29 is preferably located on the top surface 12 of the base 11. In use, the switch 29 is designed for permitting selective activation and deactivation of the light source 25 by the user.

Ideally, the ornament 20 has a hollow interior and an opening 30 into the hollow interior of the ornament 20. The ornament 20 has a cap 31 substantially closing the opening 30 of the ornament 20. In this embodiment, the light source preferably comprises a luminescent chemical light source 32 that is insertable into the ornament 20 through the opening 30 of the ornament 20.

Optionally, the base 11 may have a mounting bracket 33 designed for hanging on a window of the vehicle 1. Preferably, the mounting bracket 33 is coupled to one of the end edges 15 of the base 11 and extends in an upwards direction with respect to the top surface 12 of the base 11. In this embodiment, it is preferred that a 12V cigarette adapter plug 38 is extended from the base 11 by a flexible electric cord. The adapter plug 38 is electrically connected to the light source 25 for electrically connecting the light source 25 to a power source 27 of the vehicle 1 through the cigarette lighter of the vehicle 1.

Figure 6:
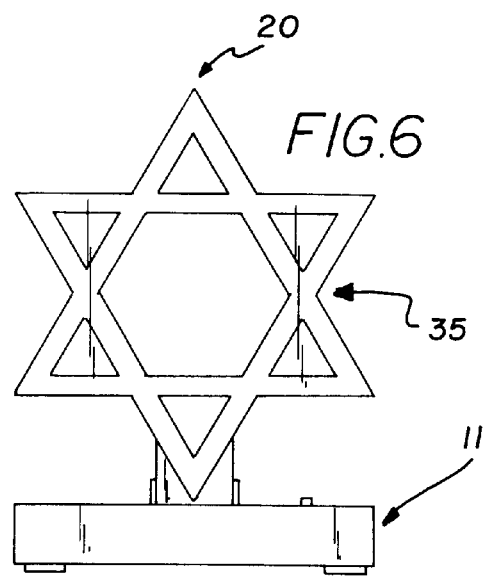
FIG. 6 is a schematic side view of the present invention with the ornament having a Star of David exterior configuration.
Figure 7:
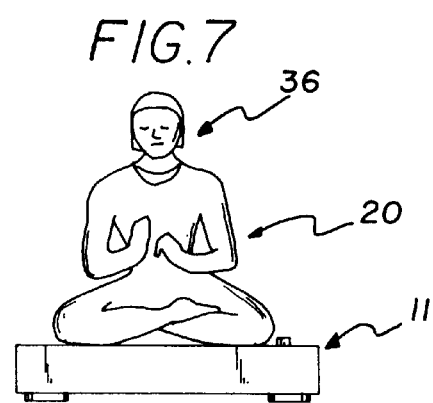
FIG. 7 is a schematic side view of the present invention with the ornament having a sitting Buddha exterior configuration.
Figure 8:
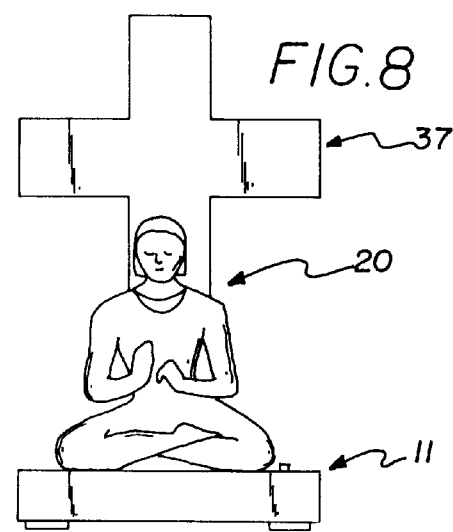
FIG. 8 is a schematic side view of the present invention with the ornament having a sitting Buddha and cross exterior configuration.

The exterior of the ornament 20 may be shaped in a variety of configurations. For example, the ornament 20 may an exterior configured to resemble a cross 34 as illustrated in FIGS. 1–5. The cross 34 preferably has a longitudinal axis extending generally perpendicular to the top surface 12 of the base 11. In another embodiment, the ornament 20 may have an exterior configured to resemble a Star of David 35 as shown in FIG. 6. The ornament 20 may also have an exterior configured to resemble a sitting figure of Buddha 36 (FIG. 7) or the combination of Buddha and a cross together 37 (FIG. 8).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated roof ornament attachment for attaching to a vehicle, said illuminated roof ornament attachment comprising:

a base adapted for attachment to an exterior surface of a vehicle, said base being generally rectangular in configuration and having top and bottom surfaces, and an outer perimeter comprising a pair of end edges and a pair of side edges, and a plurality of corner edges;

said top and bottom surfaces of said base being generally planar and lying in generally parallel planes;

said end edges and said side edges of said base being generally straight, said end edges of said base extending generally parallel to one another, said side edges of said base extending generally parallel to one another and generally perpendicular to said end edges of said base;

said base having a thickness defined between said top and bottom surfaces of said base, a length defined between said end edges of said base, and a width defined between said side edges of said base;

wherein said length of said base is at least about two times greater than said width of said base, wherein said thickness of said base is less than about one-fourth said width of said base;

said bottom surface of said base being adapted for attachment to the exterior of the vehicle, wherein said bottom of said base has a plurality of magnets for magnetically attaching said bottom surface of said base to the exterior of the vehicle, a magnet being positioned on said bottom of said base adjacent each of said corner edges of said base;

an ornament being upwardly extended from said top surface of said base, said ornament being centrally positioned on said top surface of said base;

said ornament having a lower end coupled to said top surface of said base, said lower end of said ornament having a generally rectangular periphery;

said top surface of said base having a plurality of retaining tabs detachably coupling said lower end of said ornament to said top surface of said base, said retaining tabs being arranged along a generally rectangular outline around said lower end of said ornament;

said ornament having a plurality of outwardly extending retaining nubs adjacent lower end of said ornament, each of said retaining tabs having a retaining recess, each of said retaining nubs being associated with a retaining recess, each of said retaining nubs being inserted into the associated retaining recess;

said ornament comprising a translucent material for permitting passage of light therethrough;

a light source being provided in said ornament for illuminating said ornament;

wherein said light source is mounted to said base, said lower end of said ornament having a hole extending into said ornament, said light source being extended through said hole into said ornament;

a power source for powering said light source, said power source being electrically connected to said light source;

wherein said power source comprises a battery power source, said power source being provided in said base;

said base having an access panel providing a closable opening into said base for permitting user access to said power source, said access panel being located on said top surface of said base adjacent one end edge of said base;

a switch being mounted to said base and being electrically connected to said light source, said switch being located on said top surface of said base; and wherein said ornament has an exterior configured to resemble a cross, said cross having a longitudinal axis extending generally perpendicular to said top surface of said base.

2. The illuminated roof ornament attachment of claim 1, wherein said ornament has an opening into said ornament, said ornament having a cap substantially closing said opening of said ornament.

3. The illuminated roof ornament attachment of claim 1, wherein said base has a mounting bracket adapted for hanging on a window of the vehicle, wherein said mounting bracket is coupled to one of said edges of sid base and extends in an upwards direction with respect to said top surface of said base.

* * * * *